(12) United States Patent
Florek et al.

(10) Patent No.: US 8,406,809 B2
(45) Date of Patent: Mar. 26, 2013

(54) CONFIGURATION WITH THE PAYMENT BUTTON IN THE MOBILE COMMUNICATION DEVICE, THE WAY THE PAYMENT PROCESS IS STARTED

(75) Inventors: Miroslav Florek, Bratislava (SK); Michal Masaryk, Bratisalva (SK)

(73) Assignee: Logomotion, S.R.O. (SK)

( * ) Notice: Subject to any disclaimer, the term of this patent is extended or adjusted under 35 U.S.C. 154(b) by 0 days.

(21) Appl. No.: 12/899,346

(22) Filed: Oct. 6, 2010

(65) Prior Publication Data
US 2011/0021175 A1 Jan. 27, 2011

Related U.S. Application Data

(63) Continuation of application No. PCT/IB2010/051915, filed on May 1, 2010.

(51) Int. Cl.
*H04N 1/00* (2006.01)
(52) U.S. Cl. .................................. 455/558; 370/338
(58) Field of Classification Search ............. 455/558; 370/338
See application file for complete search history.

(56) References Cited

U.S. PATENT DOCUMENTS

| | | | |
|---|---|---|---|
| 5,574,470 | A | 11/1996 | de Vall |
| 5,608,417 | A | 3/1997 | de Vall |
| 6,062,472 | A | 5/2000 | Cheung |
| 6,070,795 | A | 6/2000 | Feiken |
| 6,070,796 | A | 6/2000 | Sirbu |
| 6,450,407 | B1 | 9/2002 | Freeman et al. |
| 6,615,243 | B1 | 9/2003 | Meggeid et al. |
| 6,745,935 | B1 | 6/2004 | Grieu et al. |
| 6,828,670 | B2 | 12/2004 | Hayana et al. |
| 6,976,011 | B1 * | 12/2005 | Capitant et al. ............... 705/67 |
| 7,364,092 | B2 | 4/2008 | Narendra et al. |
| 7,374,100 | B2 | 5/2008 | Jei et al. |

(Continued)

FOREIGN PATENT DOCUMENTS

| | | |
|---|---|---|
| CN | 1450782 | 10/2003 |
| CN | 1627321 | 6/2005 |

(Continued)

OTHER PUBLICATIONS

"EMV Mobile Contactless Payment: Technical Issues and Position Paper", www.emvco.com/mobile.aspx, © Oct. 11, 2007, accessed Apr. 20, 2009, 37 pages.

(Continued)

*Primary Examiner* — Marcos Batista
(74) *Attorney, Agent, or Firm* — Woodcock Washburn LLP

(57) ABSTRACT

On the interface side (7), a removable memory card (2), on which at least one payment card unit is located (5), appears to be a removable memory card (2) for the extension of the mobile communication device's (4) memory capacity up till the moment when the payment purpose button (1) is physically pressed. Then the removable memory card (2) switches into the payment function's access mode and is made accessible on its interface (7) as a card with a Secure Element (3) having at least one payment card unit (5). After the termination and/or interruption of the payment process, the removable memory card (2) switches into the access mode for the memory capacity extension function of the mobile communication device (4). This configuration and method increase the security of the payment process while retaining high level of manipulation comfort. At the mobile communication device with a payment purpose button (1) it is possible to switch the access mode exclusively by physical press of the hardware payment button (1) by which the unauthorized start of the payment application without the user's knowledge is prevented.

18 Claims, 5 Drawing Sheets

U.S. PATENT DOCUMENTS

| | | |
|---|---|---|
| 7,436,965 B2 | 10/2008 | Sherman |
| 7,458,518 B2 | 12/2008 | Fukuda et al. |
| 7,481,358 B2 | 1/2009 | Honjo et al. |
| 7,568,065 B2 | 7/2009 | D'Athis |
| 7,581,678 B2 | 9/2009 | Narendra et al. |
| 7,689,932 B2 | 3/2010 | Maktedar |
| 7,775,446 B2 | 8/2010 | Ochi et al. |
| 7,805,615 B2 | 9/2010 | Narendra et al. |
| 7,828,214 B2 | 11/2010 | Narendra et al. |
| 8,055,184 B1 | 11/2011 | Dimartino et al. |
| 8,127,999 B2 | 3/2012 | Diamond |
| 2001/0005832 A1 | 6/2001 | Cofta et al. |
| 2002/0062249 A1 | 5/2002 | Iannacci |
| 2002/0147658 A1 | 10/2002 | Kwan |
| 2002/0163479 A1 | 11/2002 | Lin et al. |
| 2003/0055738 A1 | 3/2003 | Alie |
| 2003/0138135 A1 | 7/2003 | Chung et al. |
| 2004/0066278 A1 | 4/2004 | Hughes et al. |
| 2004/0087339 A1 | 5/2004 | Goldthwaite et al. |
| 2004/0127256 A1 | 7/2004 | Goldthwaite et al. |
| 2005/0072595 A1 | 4/2005 | Cho |
| 2005/0092835 A1 | 5/2005 | Chung et al. |
| 2005/0116050 A1 | 6/2005 | Jei et al. |
| 2005/0125745 A1 | 6/2005 | Engestrom |
| 2005/0222949 A1 | 10/2005 | Inotay et al. |
| 2005/0269401 A1 | 12/2005 | Spitzer et al. |
| 2005/0269402 A1 | 12/2005 | Spitzer et al. |
| 2006/0143578 A1 | 6/2006 | Maktedar |
| 2006/0146023 A1 | 7/2006 | Kidron |
| 2006/0152288 A1 | 7/2006 | Peng et al. |
| 2006/0186809 A1 | 8/2006 | Narendra et al. |
| 2006/0219776 A1 | 10/2006 | Finn |
| 2006/0224470 A1 | 10/2006 | Garcia et al. |
| 2006/0226217 A1 | 10/2006 | Narendra et al. |
| 2006/0255160 A1 | 11/2006 | Winkler |
| 2007/0014407 A1 | 1/2007 | Narendra et al. |
| 2007/0014408 A1 | 1/2007 | Narendra et al. |
| 2007/0016957 A1 | 1/2007 | Seaward et al. |
| 2007/0050871 A1 | 3/2007 | Mashhour |
| 2007/0083772 A1 | 4/2007 | Harada et al. |
| 2007/0106564 A1 | 5/2007 | Matotek et al. |
| 2007/0125840 A1 | 6/2007 | Law et al. |
| 2007/0152035 A1* | 7/2007 | Adams et al. ............... 235/380 |
| 2007/0158438 A1 | 7/2007 | Fukuda et al. |
| 2007/0171079 A1 | 7/2007 | Saito |
| 2007/0233615 A1 | 10/2007 | Tumminaro |
| 2007/0235539 A1 | 10/2007 | Sevanto et al. |
| 2007/0241180 A1 | 10/2007 | Park et al. |
| 2007/0278290 A1 | 12/2007 | Messerges et al. |
| 2007/0293155 A1 | 12/2007 | Liao |
| 2008/0048036 A1 | 2/2008 | Matsumoto et al. |
| 2008/0059375 A1 | 3/2008 | Abifaker |
| 2008/0093467 A1 | 4/2008 | Narendra et al. |
| 2008/0120129 A1 | 5/2008 | Seubert et al. |
| 2008/0233906 A1 | 9/2008 | Mitomo et al. |
| 2008/0250244 A1 | 10/2008 | Baentsch et al. |
| 2008/0270246 A1 | 10/2008 | Chen |
| 2009/0063312 A1 | 3/2009 | Hurst |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain |
| 2009/0070691 A1 | 3/2009 | Jain |
| 2009/0070861 A1 | 3/2009 | Jain |
| 2009/0088077 A1 | 4/2009 | Brown et al. |
| 2009/0098825 A1 | 4/2009 | Huomo et al. |
| 2009/0108063 A1 | 4/2009 | Jain et al. |
| 2009/0119190 A1 | 5/2009 | Realini |
| 2009/0124273 A1 | 5/2009 | Back |
| 2009/0132418 A1 | 5/2009 | Morsillo et al. |
| 2009/0191812 A1 | 7/2009 | Teruyama et al. |
| 2009/0193491 A1 | 7/2009 | Rao |
| 2009/0199206 A1 | 8/2009 | Finkenzeller et al. |
| 2009/0199283 A1 | 8/2009 | Jain |
| 2009/0200371 A1 | 8/2009 | Kean et al. |
| 2009/0261172 A1 | 10/2009 | Kumar et al. |
| 2009/0265544 A1 | 10/2009 | Moona et al. |
| 2009/0265552 A1 | 10/2009 | Moshir et al. |
| 2009/0298540 A1 | 12/2009 | Narendra et al. |
| 2009/0307139 A1 | 12/2009 | Mardikar et al. |
| 2009/0307142 A1 | 12/2009 | Mardikar |
| 2009/0319287 A1 | 12/2009 | Hammad et al. |
| 2010/0012721 A1 | 1/2010 | Jain et al. |
| 2010/0023449 A1* | 1/2010 | Skowronek et al. ............ 705/39 |
| 2010/0044444 A1 | 2/2010 | Jain et al. |
| 2010/0045425 A1 | 2/2010 | Chivallier |
| 2010/0062808 A1 | 3/2010 | Cha et al. |
| 2010/0063893 A1 | 3/2010 | Townsend |
| 2010/0203870 A1 | 8/2010 | Hubinak et al. |
| 2010/0205432 A1 | 8/2010 | Corda et al. |
| 2010/0213265 A1 | 8/2010 | Narendra et al. |
| 2010/0258639 A1 | 10/2010 | Florek et al. |
| 2010/0262503 A1 | 10/2010 | Florek et al. |
| 2010/0274677 A1 | 10/2010 | Florek et al. |
| 2010/0274726 A1 | 10/2010 | Florek et al. |
| 2010/0323617 A1 | 12/2010 | Hubinak et al. |
| 2011/0282753 A1 | 11/2011 | Mullen et al. |

FOREIGN PATENT DOCUMENTS

| | | |
|---|---|---|
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026 435 B3 | 12/2006 |
| DE | 10 2006 019 628 | 10/2007 |
| DE | 10 2007 019 272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1729253 | 12/2006 |
| EP | 1752902 A2 | 2/2007 |
| EP | 1752903 A2 | 2/2007 |
| EP | 1785915 A | 5/2007 |
| EP | 1943606 A2 | 7/2008 |
| FR | 0611189 | 9/1926 |
| FR | 0611190 | 9/1926 |
| GB | 2390509 A | 1/2004 |
| GB | 2424151 A | 9/2006 |
| GB | 2432031 A | 9/2007 |
| IE | 980562 | 2/2000 |
| JP | 2003-131808 | 5/2003 |
| JP | 2004-348235 A | 12/2004 |
| JP | 2005-284862 A | 10/2005 |
| JP | 2006-033229 | 2/2006 |
| JP | 2007-060076 A | 3/2007 |
| JP | 2007-166379 | 6/2007 |
| JP | 2007-304910 A | 11/2007 |
| JP | 2008-083867 A | 4/2008 |
| KR | 2002-0012738 | 2/2002 |
| KR | 2002-0051696 | 6/2002 |
| KR | 2002-0073106 | 9/2002 |
| KR | 2003-0005088 A | 1/2003 |
| KR | 2004-0012401 A | 2/2004 |
| KR | 2004-0060249 | 7/2004 |
| KR | 2004-0089800 A | 10/2004 |
| KR | 2005-0008622 A | 1/2005 |
| KR | 2007-0093133 | 9/2007 |
| SI | 22595 | 2/2009 |
| WO | WO 2003/012717 A1 | 2/2003 |
| WO | WO 2005/057316 | 6/2005 |
| WO | WO 2005/086456 | 9/2005 |
| WO | WO 2006/009460 | 1/2006 |
| WO | WO 2007/076456 A | 7/2007 |
| WO | WO 2007/105469 | 9/2007 |
| WO | WO 2007/136939 | 11/2007 |
| WO | WO 2008/012416 A2 | 1/2008 |
| WO | WO 2008/041861 A | 4/2008 |
| WO | WO 2008/063990 | 5/2008 |

| | | |
|---|---|---|
| WO | WO 2008/105703 A1 | 9/2008 |
| WO | WO 2009/014502 | 1/2009 |
| WO | WO 2009/087539 | 7/2009 |
| WO | WO 2009/118681 | 10/2009 |
| WO | WO 2010/011670 | 1/2010 |
| WO | WO 2010/023574 | 3/2010 |
| WO | WO 2010/032215 | 3/2010 |
| WO | WO 2010/032216 | 3/2010 |
| WO | WO 2010/044041 | 4/2010 |
| WO | WO 2010/097777 | 9/2010 |
| WO | WO 2010/122520 | 10/2010 |
| WO | WO 2010/128442 | 11/2010 |
| WO | WO 2010/131226 | 11/2010 |

OTHER PUBLICATIONS

"NFC Frequently Asked Questions," NFC for Customers, www.nfc-forum.org., Retrieved from the internet on Nov. 7, 2008, 5 pages.

Smart Card Alliance, "RF-Enabled Applications and Technology: Comparing and Contrasting RFID and RF-Enabled Smart Cards", Smart Card Alliance Identity Council, Jan. 2007, 7 pages.

Smart Card Alliance: "Proximity Mobile Payments: Leveraging NFC and the Contactless Financial Payments Infrastructure a Smart Card Alliance Contactless Payments Council White Paper", www.smartcardalliance.org, © Sep. 1, 2007, accessed Nov. 7, 2008, 10 pages.

Wikipedia, "Cellular Frequencies" Wikipedia, The Free Encyclopedia, http://en.wikipedia.rog.wiki/cellular_frequencies, accessed Apr. 8, 2012, 5 pages.

Wikipedia, "Bluetooth", Wikipedia, The Free Encyclopedia, http://enwikipedia.org/wiki/bluetooth, accessed Apr. 8, 2012, 19 pages.

"Intelligent Mouse", IBM Technical Disclosure Bulletin, International Business Machines Corp., Thornwood, US, Feb. 1, 1995, 38(2), p. 463.

Finkenzeller (Ed.), "RFID-Handbuch: Grundlagen und praktische Anwendungen Induktiver Funkanlagen, Transponder und kontaktloser Chipkarten", Jan. 1, 2002, 225-231 (English abstract attached).

* cited by examiner

CONFIGURATION WITH THE PAYMENT BUTTON IN THE MOBILE COMMUNICATION DEVICE, THE WAY THE PAYMENT PROCESS IS STARTED

CROSS-REFERENCE TO RELATED APPLICATIONS

This application is a continuation of PCT Application No. PCT/IB2010/051915, filed May 1, 2010, which claims priority from Slovak patent applications nos. PP00032-2009, filed May 3, 2009, PP50009-2010, filed Mar. 27, 2010, PP50012-2010, filed Apr. 8, 2010, and PP50016-2010, filed Apr. 19, 2010. The entire disclosure of each of the above-referenced patent applications is hereby incorporated herein by reference.

TECHNICAL FIELD

The solution refers to increase in security and comfort of payments over the mobile communication device, such as a mobile phone, where data on the payment card and possibly even on the payment terminal are stored on the removable memory card that is e.g. in the form of a SD, microSD card and that is inserted into a corresponding slot of the mobile communication device.

BACKGROUND

In times when the usage of mobile communication devices, such as mobile phones, for cashless payment applications is increasing, the request for increase in comfort and security of payment processes will rise. Mobile communication devices have the possibility of intentional but also unobserved connection to a mobile data network, a fact that raises the risk of penetration by harmful programs into the mobile communication device's environment.

A purpose Pay-button is known according to the patent file published as WO 2010/011670 A2. The NFC communication element necessary for the run of contactless payment application is started by it. This button simplifies launch of the payment application, however its connection to the NFC communication element does not offer increased security in comparison to older solutions, where the payment application was started by a virtual button displayed in the menu on the mobile communication device's display. The analysis of possible attacks on the payment card stored within the mobile communication device pointed out a risk based on the fact that an unsuitable program, e.g. in the form of Trojan horse, can initialize the payment application without the user's knowledge. Because the payment card in the mobile communication device is inserted in the payment card reader all the time, then this kind of placement itself includes the possibility that there will be constant trials to read data from the card. For this reason there is a danger that in the future it will come to the failure of the payment card's security level, e.g. even of the EMV (EuropayMastercardVisa) standard, a situation that was considered to be improbable until recently since the payment card was inserted in the reader, e.g. in the POS (Point of sales) terminal, or in the ATM, for a long time and practically without interruption. For this reason, such a solution is required, which will not only increase the comfort but also the security of the payment card. The existing purpose buttons as e.g. the photo button in the mobile phone had only the purpose of accelerating and simplifying the access to selected function of the phone and it was not necessary to solve the security question of intentional start of the selected function.

The new, more secure solution should be comfortable enough so it would not lower the comfort of the attendant, which is an important presumption in order to spread cashless payments using a mobile phone.

SUMMARY

The deficiencies mentioned are to a great extent eliminated by a configuration with a payment button in the mobile communication device, where in accordance with this solution a removable memory card with at least one payment card unit is also located. The subject matter of this solution lies in the fact that the removable memory card has two independent access modes. One access mode is designed and set for the common function of the removable memory card which rests in the extension of the memory capacity of the mobile communication device, such as a mobile phone. This access mode prevents access to the unit with the payment card and to the contactless communication element on the removable memory card. Basically, on the removable memory card's interface this card appears to be a common removable card without the Secure Element and without the communication element on the removable memory card when the card is in this access mode.

The second access mode is designed and set for the payment function of the removable memory card, where the access to the unit with the payment card and also to the contactless communication element on the removable memory card is allowed from the mobile communication device's circuits over an interface. In preferable configuration even the unit with the payment terminal can be located on the removable memory card and then this unit is also accessible just and only in the access mode for the payment function.

The two modes are alternatively selectable, it is important that the access mode for the payment function of the removable memory card is active only after physical press of the hardware payment button. Even the common flash memory can be accessible in the payment function access mode.

The removable memory card, on which at least one payment card unit is located, appears to be a removable memory card for the extension of the memory capacity of the mobile communication device on the interface and that up until the moment when the purpose payment button is physically pressed. Then the removable memory card is made accessible on the interface as a card with Secure Element and at least one payment card unit.

The removable memory card according to this solution has an architecture which encompasses a commonly accessible flash memory and also has hardware and software elements of the payment card, or even of the payment terminal. During common usage of the mobile communication device, the removable memory card behaves as if it contained only a flash memory for the extension of the memory capacity with a corresponding microcontroller. In this state, the reading and writing of files is enabled in the memory of the removable memory card, however other elements, e.g. the Secure Element, the NFC communication element are hidden and cannot be managed or run in this mode.

The existence of the purpose hardware payment button enables the change of the removable payment card's character on its interface level to be tied exclusively to the physical press of the payment button. The necessity of physical press of the button excludes the possibility to run the payment application by some undesirable software or script imitating the will of the user.

By this configuration we will exclude the risk that the removable memory card's interface will be misused through the trials to overcome the security elements without the user's knowledge. The connection between the physical press of the button and the run of the corresponding Firmware can be stored in the memory in such a way that it is either never possible to rewrite it, change it or update it or that it is not possible to do it without the corresponding password. The unauthorized program then cannot emulate the signal from the physical payment button in such a way so this signal would appear to the other steps of the application's run as a real physical press of the button. Since the intruder will not have the possibility to physically press the described button on the remote mobile communication device, it is excluded that he could gain uncontrollable access to the payment card's unit or to the unit of the payment terminal on the removable memory card. The removable memory card will behave as a standard memory card and only after physical press of the payment button it will switch into the payment card mode. The end of payment application will automatically switch the card's mode into the common extension of the memory capacity mode.

The new way of starting the payment process in the mobile communication device is based on the same principle of the two access modes. This way encompasses the communication between the interface of the mobile communication device and an inserted removable memory card with at least one payment card unit according to this solution, the subject matter of which is based on the fact that before the run of the payment process the removable memory card is in the access mode to the common extension of memory capacity function. Then the unit with the payment card, and pertinently even the contactless communication element and the unit with the payment terminal, in case they are located on the removable memory card, are inaccessible from the side of its interface. Only exclusively after the physical press of the hardware payment button, the removable memory card switches into access mode for the payment function of the removable memory card with allowed access to the unit with the payment card.

BRIEF DESCRIPTION OF THE DRAWINGS

The solution is explained in detail on the FIGS. 1 to 5.

On the FIG. 1, there is a schematically displayed diagram showing the successiveness of the payment application's run with the press of the hardware payment button, where it is possible to see the localization of the individual tasks and processes on the phone hardware/phone firmware/removable memory card level.

Figure 1:
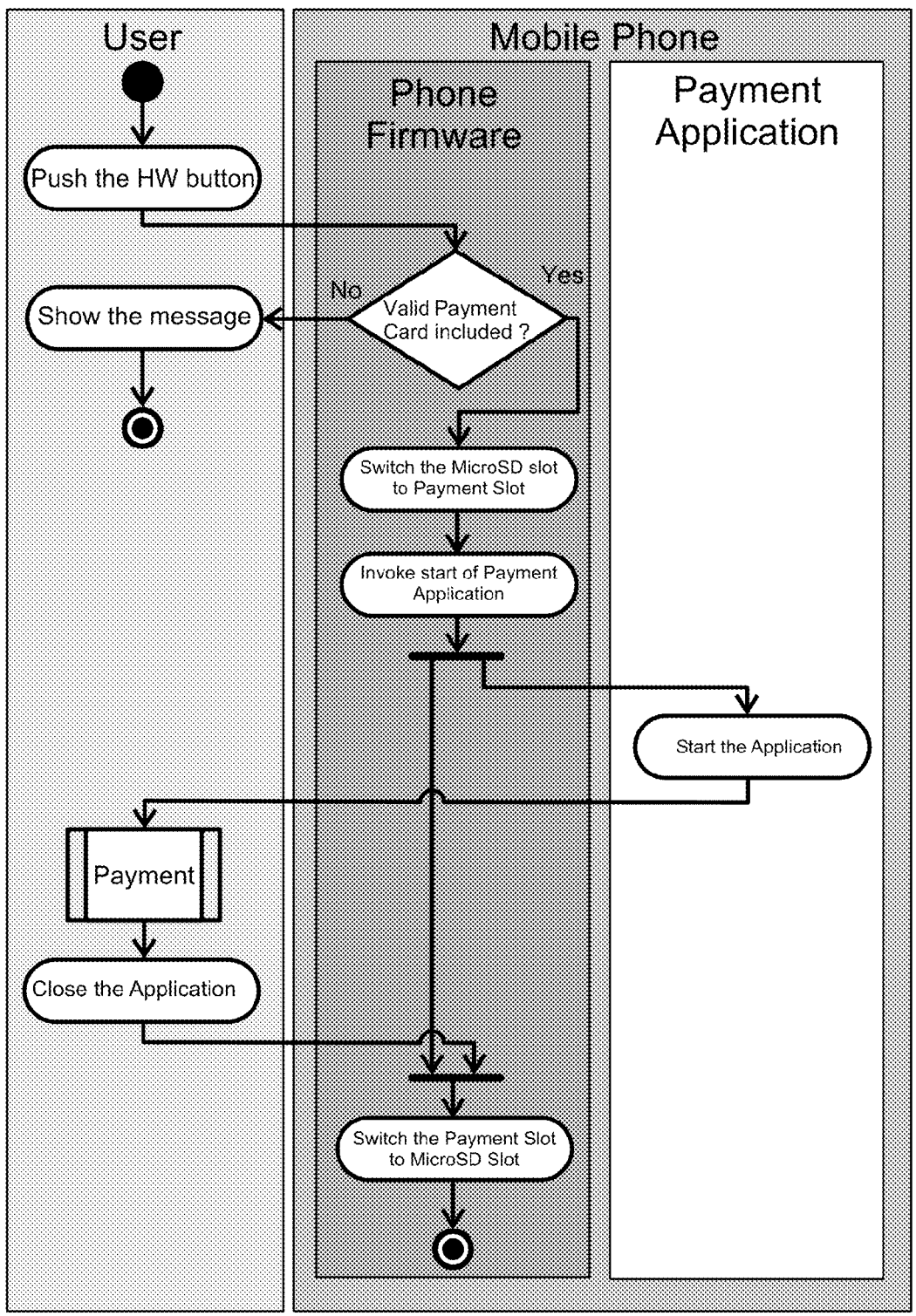
Figure 2:
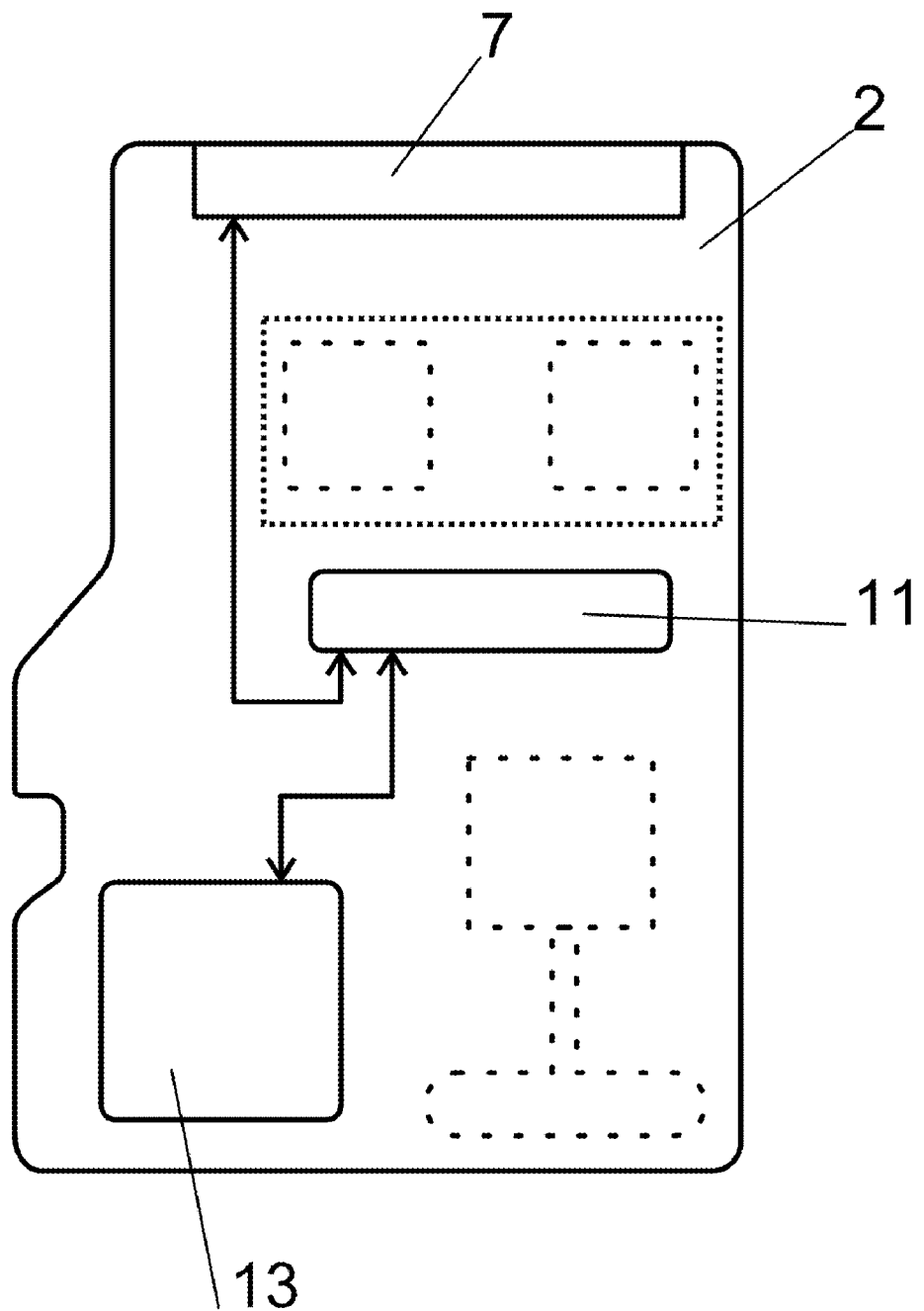

On the FIG. 2 we can see the structure, with which the removable memory card presents itself on the outside in case it is in the common extension of the mobile phone's memory access mode.

Figure 3:
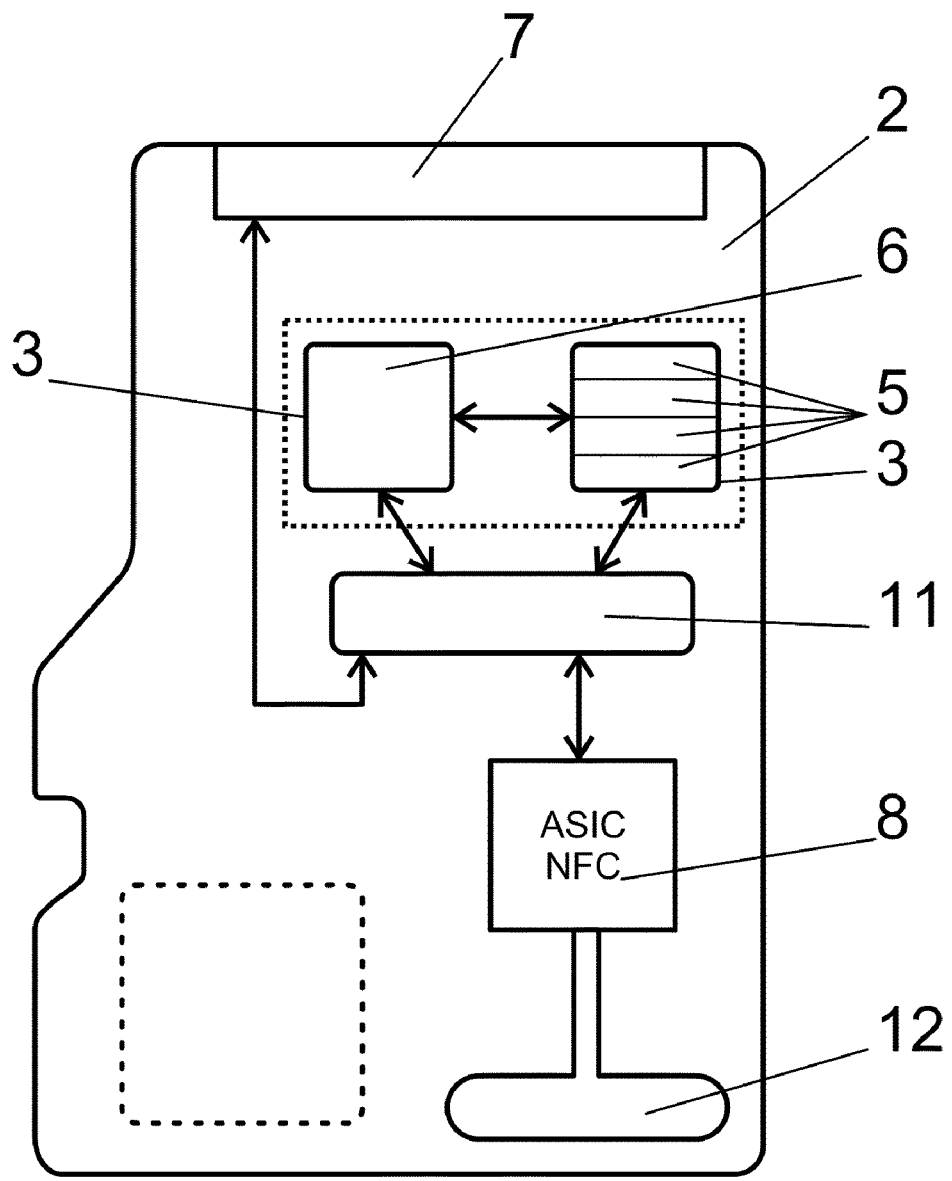

On the FIG. 3 there is the structure, with which the removable memory card presents itself on the outside in case of payment card access mode. In this configuration there is even the unit with the payment terminal located on the removable memory card.

Figure 4:
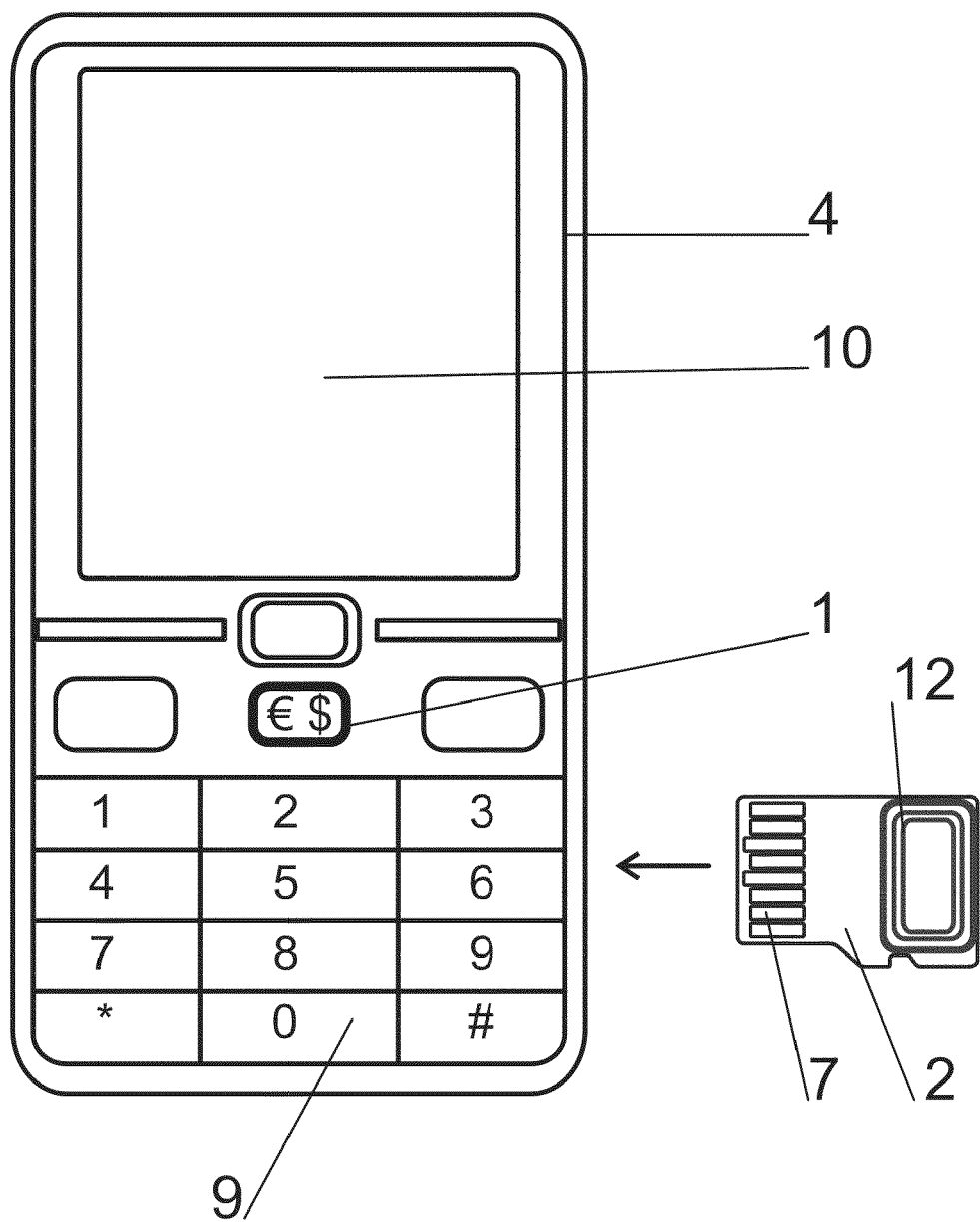

On the FIG. 4 there is an example of mobile phone with the payment button.

Figure 5:
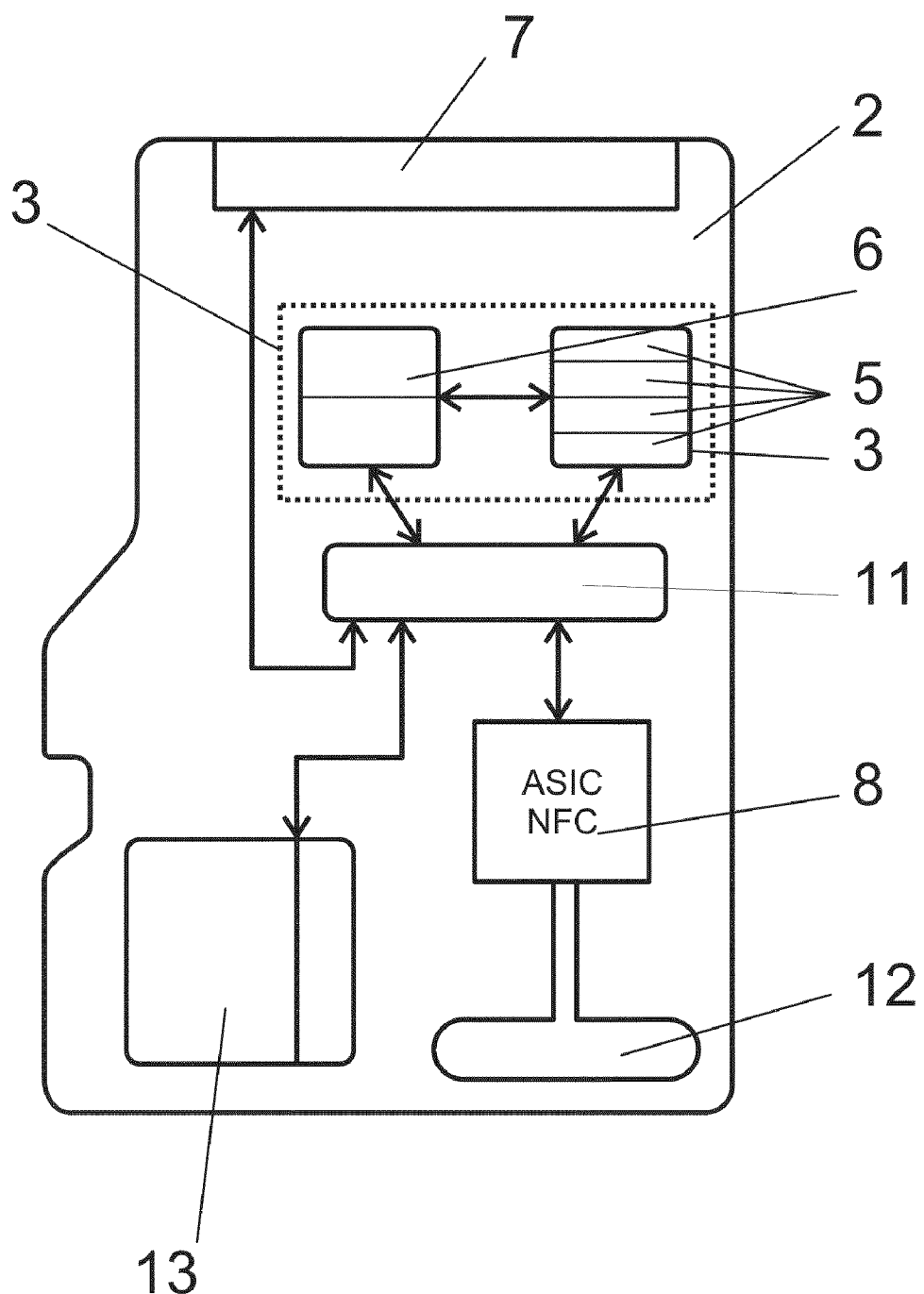

On the FIG. 5 there is removable memory card of the microSD type with two independent Secure Elements and with the communication element that is located directly on the memory card just like antenna is. This figure can also depict the configuration with the unit of indifferent POS payment terminal and with four independent payment cards' units from various banks.

DETAILED DESCRIPTION OF ILLUSTRATIVE EMBODIMENTS

In this example according to the FIGS. 1 to 4, there is a description of the system, where a removable memory card 2 is in the form of microSD card. In this example there are two Secure Elements 3 located on it, where one Secure Element 3 is designed for the payment card unit 5, or respectively for several payment card units 5 from different issuers and the second Secure Element 3 contains the payment terminal unit 6. In another example the removable memory card 2 can contain only one payment card unit 5 without the payment terminal unit 6 being localized.

The removable memory card 2 with a common flash memory 13 has the interface 7 of the common microSD standard and it is inserted into the mobile communication device's 4 slot. It is a common slot designed for the insertion of the extension memories.

In this example, the NFC communication element 8 with an antenna 12 is located on the removable memory card 2. The mobile communication device 4 has a payment button 1 located in the keyboard field. The payment button 1 is connected with a microswitch on the printed circuit of the mobile communication device's 4. The specific realization of the microswitch is not important and can be of different formats, e.g. as a membrane switch, capacity switch and similar.

The payment button 1 is connected to the Firmware in such a way that the only acceptable command for the change of access mode of the removable memory card 2 can come from the contact of the payment button 1 or at least in case the mobile communication device 4 is equipped with this kind of payment button 1. In case, the same removable memory card 2 will be inserted into the slot of the mobile communication device 4 without the purpose hardware payment button 1, the change of access mode will be realized over the menu on the display 10 of the mobile communication device 4. That being the case, the removable memory card 2 will be functional in both access modes, however the entire connection with the mobile communication device 4 will have lower security of the payment.

In the mobile phone, which is equipped with the payment button 1, it will not be possible to access Secure Element 3 on the removable memory card by any other way then over the predefined firmware connected with the payment button 1. In this example it will be the LGM application.

The two access modes can have the following characteristics:

| function | access mode extension of the memory | access mode for payment function |
| --- | --- | --- |
| read/write files | YES | YES |
| NFC communication | NO | NO |
| extended access (SDIO . . .) | YES/NO (according to the phone) | YES |
| access to the SE from the application in the phone | NO | YES |
| file cache memory in flash | YES/NO (according to the phone) | NO |
| permanent powering of the card | YES/NO (according to the phone) | YES |

In the access mode of the payment function, the caching of the files on the removable memory card 2 will be switched off, the access to the flash memory 13 and the access into the file system will be supported.

In case the mobile communication device 4 will be capable of supporting higher communication interface, e.g. the SDIO standard (Secure Digital Input Output), McEX, the corresponding interface can be accessible even in the access mode of the payment function.

INDUSTRIAL APPLICABILITY

The industrial applicability is obvious. With this invention, it is possible to industrially and repeatedly arrange configurations including the hardware payment button in the mobile communication device, where this button presents the selector of the current access mode of the removable memory card.

LIST OF RELATED SYMBOLS

| | |
|---|---|
| 1 | a payment button |
| 2 | a removable memory card |
| 3 | a Secure Element |
| 4 | a mobile communication device |
| 5 | a payment card unit |
| 6 | a payment terminal application |
| 7 | an interface |
| 8 | a communication element |
| 9 | a keyboard |
| 10 | a display |
| 11 | a microcontroller |
| 12 | an antenna of the removable memory card |
| 13 | a memory |

What is claimed is:

1. A removable memory card for use in a mobile communication device having a hardware payment button, the removable memory card comprising:
   a secure element;
   a contactless communication element;
   a payment card unit; and
   a memory,
   wherein the removable memory card has a first access mode for extension of a memory capacity of the mobile communication device in which access to the secure element and to the contactless communication element is blocked, and
   a second access mode for a payment function of the removable memory card with authorized access to the secure element and to the contactless communication element with the payment card unit, wherein the second access mode is active only after a physical press of the hardware payment button.

2. The removable memory card of claim 1, further comprising a payment terminal unit that is accessible exclusively in the second access mode.

3. The removable memory card of claim 1, further comprising an antenna connected to the contactless communication element.

4. The removable memory card of claim 1, wherein the removable memory card is an SD or microSD card.

5. The removable memory card of claim 1, wherein the communication element is a near-field communication (NFC) element.

6. A system for contactless payment, the system comprising:
   a mobile communication device having a hardware payment button; and
   a removable memory card comprising a secure element, a contactless communication element, a payment card unit, and a memory,
   wherein the removable memory card has a first access mode for extending a memory capacity of the mobile communication device, wherein access to the secure element and to the contactless communication element is blocked, and
   a second access mode for a payment function of the removable memory card with authorized access to the secure element and to the contactless communication element with the payment card unit, wherein the second access mode is active only after a physical press of the hardware payment button.

7. The system of claim 6, wherein the removable memory card further comprises a payment terminal unit that is accessible exclusively in the second access mode.

8. The system of claim 6, wherein the removable memory card further comprises an antenna connected to the contactless communication element.

9. The system of claim 6, wherein the mobile communication device is configured to block emulation of a signal from the payment button on an impulse from another input to the mobile communication device.

10. The system of claim 6, wherein the removable memory card is an SD or microSD card.

11. The system of claim 6, wherein the communication element is a near-field communication (NFC) element.

12. A method for starting a payment process from a mobile communication device having a hardware payment button, the method comprising:
   communicating between the mobile communication device and an interface of a removable memory card inserted into the mobile communication device, the removable memory card having a payment card unit, a secure element, a contactless communication element, and a memory,
   wherein, before the payment process is started, the removable memory card is in a first access mode for extending a memory capacity of the mobile communication device in which the payment card unit, the secure element, and the contactless communication element are inaccessible from the interface, and
   wherein, after a physical press of the hardware payment button, the removable memory card switches into a second access mode for a payment function of the removable memory card with allowed access to the payment card unit, the secure element, and the contactless communication element via the interface.

13. The method of claim 12, wherein the removable memory card comprises a secure element with a payment terminal unit that is accessible only after the removable memory card is switched into the second access mode.

14. The method of claim 12, wherein, after the payment process is ended or interrupted, the removable memory card switches back into the first access mode.

15. The method of claim 12, wherein the removable memory card further comprises an antenna connected to the contactless communication element.

16. The method of claim 12, further comprising blocking an emulation of a signal from the payment button on an impulse from another input to the mobile communication device.

17. The method of claim 12, wherein the removable memory card is an SD or microSD card.

18. The method of claim 12, wherein the communication element is a near-field communication (NFC) element.

* * * * *